(12) United States Patent
Rollins et al.

(10) Patent No.: US 12,233,702 B2
(45) Date of Patent: Feb. 25, 2025

(54) STRUCTURAL ASSEMBLY FOR BATTERY STRUCTURE OF ELECTRIC VEHICLE

(71) Applicant: Ford Global Technologies, LLC, Dearborn, MI (US)

(72) Inventors: Scott M. Rollins, Highland, MI (US); Dominic Mario Bertolini, Royal Oak, MI (US); David Doman, Canton, MI (US); Francisco Fernandez-Galindo, Canton, MI (US); John Hammack McCormick, Clawson, MI (US); Jason Luke Sielaff, Brighton, MI (US); Liam E. West, Ferndale, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 343 days.

(21) Appl. No.: 17/980,212

(22) Filed: Nov. 3, 2022

(65) Prior Publication Data

US 2024/0149656 A1    May 9, 2024

(51) Int. Cl.
*B60K 1/04*       (2019.01)
*B60L 50/60*      (2019.01)

(52) U.S. Cl.
CPC ............. *B60K 1/04* (2013.01); *B60L 50/66* (2019.02); *B60K 2001/0438* (2013.01)

(58) Field of Classification Search
CPC .... B60K 1/04; B60K 2001/0438; B60L 50/66
See application file for complete search history.

(56) References Cited

U.S. PATENT DOCUMENTS

| | | | |
|---|---|---|---|
| 6,972,544 B2 | 12/2005 | Seman, Jr. et al. | |
| 10,559,792 B1 | 2/2020 | Combs | |
| 2006/0019155 A1 | 1/2006 | Seman, Jr. et al. | |
| 2009/0226806 A1* | 9/2009 | Kiya | B60R 16/04 |
| | | | 429/186 |
| 2012/0223113 A1* | 9/2012 | Gaisne | H01M 50/249 |
| | | | 224/538 |
| 2013/0059187 A1* | 3/2013 | Kang | H01M 50/227 |
| | | | 429/100 |
| 2017/0005371 A1* | 1/2017 | Chidester | H01M 50/20 |
| 2018/0212292 A1* | 7/2018 | Maguire | H01M 50/227 |
| 2018/0241019 A1* | 8/2018 | Iqbal | B60K 6/28 |
| 2018/0342718 A1* | 11/2018 | Lacovoni | B62D 21/152 |
| 2019/0044203 A1* | 2/2019 | Haag | H01M 50/229 |
| 2019/0181516 A1 | 6/2019 | Seki et al. | |

(Continued)

*Primary Examiner* — Erez Gurari
(74) *Attorney, Agent, or Firm* — Burris Law, PLLC (57) ABSTRACT

A structural assembly for a battery structure of a vehicle includes a lower wall and a pair of cross members. The lower wall is configured to support a cell stack. The pair of cross members are spaced apart from each other in a longitudinal direction of the vehicle. Each cross member provides lateral support for a respective side of the cell stack and is configured to extend substantially an entire width of a battery enclosure. Each cross member of the pair of cross members includes an outer wall, an inner wall spaced apart from the outer wall, and connecting members. The outer wall, the inner wall, and connecting members cooperate with each other to define an internal cavity. The inner walls of the pair of cross members are secured to the lower wall and slidable relative to the outer walls of the pair of cross members.

20 Claims, 4 Drawing Sheets

(56) References Cited

U.S. PATENT DOCUMENTS

| | | |
|---|---|---|
| 2019/0207178 A1 | 7/2019 | Cao et al. |
| 2019/0382051 A1* | 12/2019 | Toyota .................. B62D 25/02 |
| 2020/0411819 A1* | 12/2020 | Seki .................... H01M 50/269 |
| 2020/0411821 A1* | 12/2020 | Haeusler ............. H01M 10/613 |
| 2021/0023926 A1* | 1/2021 | Dupper ............... H01M 50/24 |
| 2022/0185088 A1* | 6/2022 | Zhang ................... B60L 50/64 |
| 2022/0285770 A1* | 9/2022 | Kim .................. H01M 10/0481 |
| 2023/0129162 A1* | 4/2023 | Müller ................ B66F 9/07531 |
| | | 180/68.5 |
| 2023/0302950 A1* | 4/2023 | Maguire ................ B60L 50/66 |
| 2024/0021943 A1* | 1/2024 | Amante ................ B60L 50/66 |
| 2024/0149706 A1* | 5/2024 | Rollins ............. H01M 10/6556 |
| 2024/0239234 A1* | 7/2024 | Miao ..................... B60L 53/80 |
| 2024/0372222 A1* | 11/2024 | West .................. H01M 50/503 |

\* cited by examiner

STRUCTURAL ASSEMBLY FOR BATTERY STRUCTURE OF ELECTRIC VEHICLE

FIELD

The present disclosure relates to a structural assembly for a battery structure of an electric vehicle.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. The battery pack typically powers one or more motors to drive a set of wheels using battery arrays. In some electric vehicles, the battery arrays include a structural assembly that surrounds and cools cell stacks, especially for vehicles capable of traveling long distances (e.g., electric vehicles capable of traveling more than 500 miles). As some types of batteries age (e.g., pouch and prismatic battery cells), gas can be generated within the cells. This gas generation causes increasing internal stress. Additionally, battery packs can be subject to various vehicle and impact loads.

The present disclosure addresses these and other issues related to battery arrays in electric vehicles.

SUMMARY

This section provides a general summary of the disclosure and is not a comprehensive disclosure of its full scope or all of its features.

In one form, the present disclosure provides a structural assembly for a battery structure of an electric vehicle. The structural assembly includes a first lower wall and a pair of first cross members. The first lower wall is configured to support a first cell stack. The pair of first cross members are spaced apart from each other in a longitudinal direction of the electric vehicle. Each first cross member provides lateral support for a respective side of the first cell stack and is configured to extend substantially an entire width of a battery enclosure. Each first cross member comprises an outer wall, an inner wall spaced apart from the outer wall, and connecting members. The outer wall, the inner wall, and connecting members cooperate with each other to define an internal cavity. The inner walls of the first cross members are secured to the first lower wall and slidable relative to the outer walls of the first cross members.

In variations of the structural assembly of the above paragraph, which can be implemented individually or in any combination: the inner wall of one first cross member of the pair of first cross members comprises internal stiffening members disposed within the internal cavity and extending toward the outer wall of the one first cross member; the outer wall of the one first cross member comprises internal stiffening members disposed within the internal cavity and extending toward the inner wall of the one first cross member; the internal stiffening members of the inner wall of the one first cross member are spaced apart from the internal stiffening members of the outer wall of the one first cross member; the internal stiffening members of the inner wall of the one first cross member are spaced apart from the outer wall of the one first cross member, and the internal stiffening members of the outer wall of the one first cross member are spaced apart from the inner wall of the one first cross member; the connecting members of each first cross member comprises an upper connecting member and a lower connecting member, each of the upper and lower connecting members defining a channel that slidably receives a respective end of the inner wall of the first cross member; a lid covering the first cell stack and secured to the inner walls of the first cross members; the first cross members extend downwardly past the first lower wall and extend upwardly past the lid; the first lower wall is a cold plate, and wherein the cold plate is in a heat transfer relationship with the first cell stack; a second lower wall configured to support a second cell stack; and a pair of second cross members spaced apart from each other in a longitudinal direction of the electric vehicle and secured to ends of the second lower wall, each second cross member providing lateral support for a respective side of the second cell stack and configured to extend substantially an entire width of a battery enclosure, one second cross member of the pair of second cross members is connected to one first cross member of the pair of first cross members.

In another form, the present disclosure provides a structural assembly for a battery structure of an electric vehicle. The structural assembly includes a lower wall and a pair of cross members. The lower wall is configured to support a cell stack and is in a heat transfer relationship with the cell stack. The pair of cross members are spaced apart from each other in a longitudinal direction of the electric vehicle. Each cross member of the pair of cross members provides lateral support for a respective side of the cell stack and comprises an outer wall, an inner wall, an upper connecting member and a lower connecting member. The inner wall is spaced apart from the outer wall and secured to an end of the lower wall. The upper connecting member includes a pair of upper flanges that extend toward the lower connecting member and cooperate with each other to define an upper channel that slidably receives an upper end of the inner wall. The lower connecting member includes a pair of lower flanges that extend toward the upper connecting member and cooperate with each other to define a lower channel that slidably receives a lower end of the inner wall.

In yet another form, the present disclosure provides a battery structure of an electric vehicle. The battery structure includes a battery housing and a structural assembly disposed within the battery housing and configured to house a plurality of cell stacks. The structural assembly includes a plurality of lower walls and a plurality of cross members. Each lower wall is configured to support a respective cell stack of the plurality of cell stacks and is in a heat transfer relationship with the respective cell stack. The plurality of cross members are spaced apart from each other in a longitudinal direction of the electric vehicle. Each cross member of the plurality of cross members being positioned between a corresponding pair of cell stacks of the plurality of cell stacks. Each cross member of the plurality of cross members provides lateral support for a respective side of the corresponding pair of cell stacks and comprises a pair of outer walls, an intermediate wall, and connecting members. The connecting members of each cross member comprises an upper connecting member defining a pair of upper channels and a lower connecting member defining a pair of lower channels. Each upper channel of the pair of upper channels slidably receives an upper end of a respective outer wall of the pair of outer walls. Each lower channel of the pair of lower channels slidably receives a lower end of a respective outer wall of the pair of outer walls.

In variations of the battery structure of the above paragraph, the battery structure further includes a plurality of lids. Each lid covers a respective cell stack of the plurality of cell stacks.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
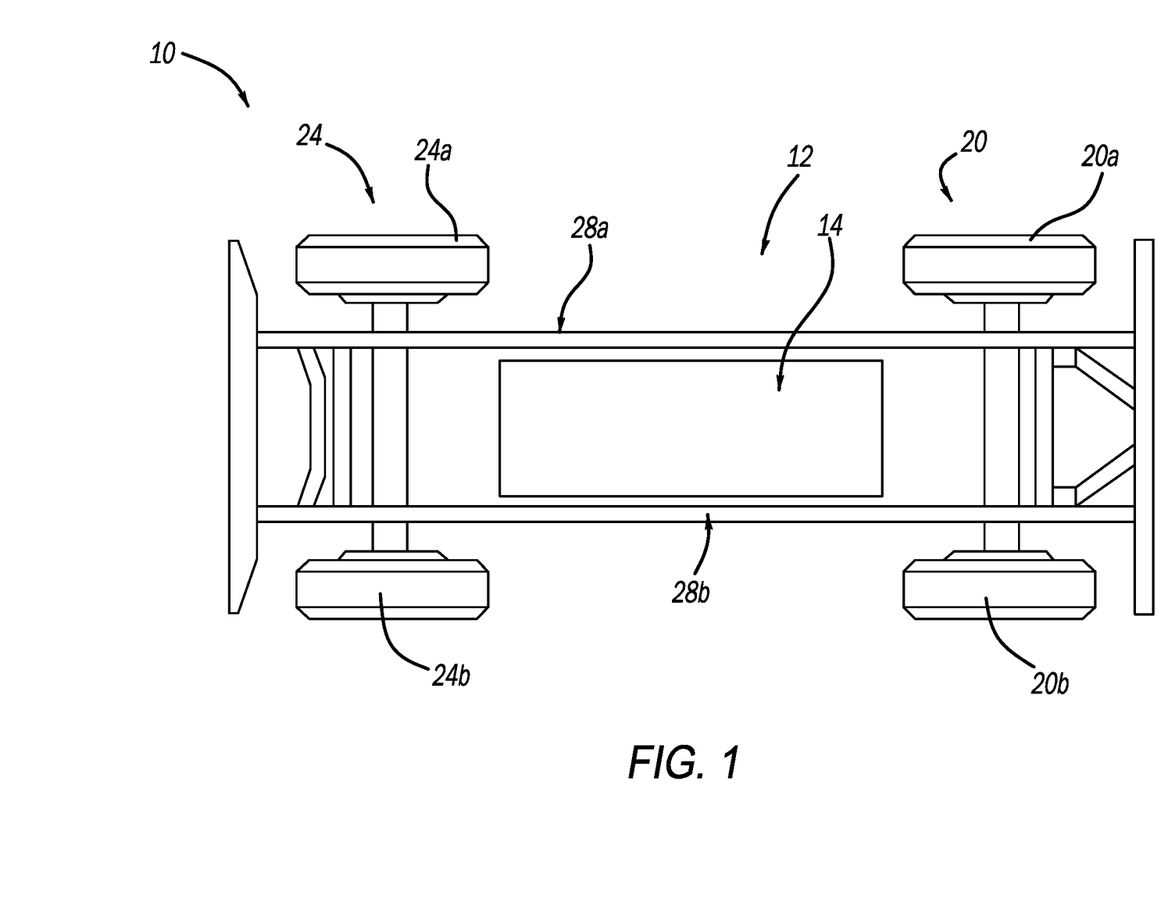
FIG. 1 is a schematic view of a vehicle including a battery housing assembly according to the principles of the present disclosure.

With reference to FIG. 1, a vehicle 10 such as an electric vehicle is shown. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a vehicle frame 12 and a battery structure or battery housing assembly 14. The vehicle frame 12 is the main supporting structure of the vehicle 10, to which various components are attached either directly or indirectly. The vehicle frame 12 includes opposed longitudinal rails 28a, 28b. The rails 28a, 28b are spaced apart from each other and may establish a length of the vehicle frame 12. In the example illustrated, the vehicle 10 is a body on frame vehicle architecture, though other configurations can be used, such as a unibody architecture, for example.

The battery housing assembly 14 powers a rear motor (not shown) to drive rear wheels 20a, 20b of a set of rear wheels 20 via a rear axle and/or powers a front motor (not shown) to drive front wheels 24a, 24b of a set of front wheels 24 via a front axle.

Figure 2:
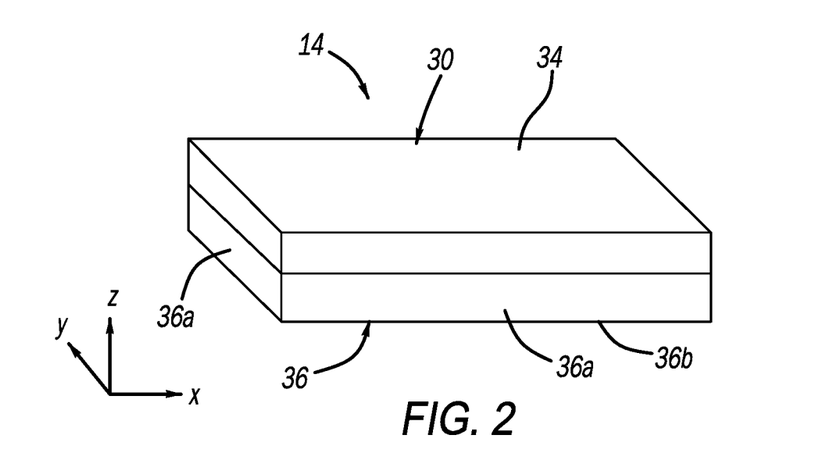
FIG. 2 is a schematic perspective view of the battery housing assembly of FIG. 1.
Figure 3:
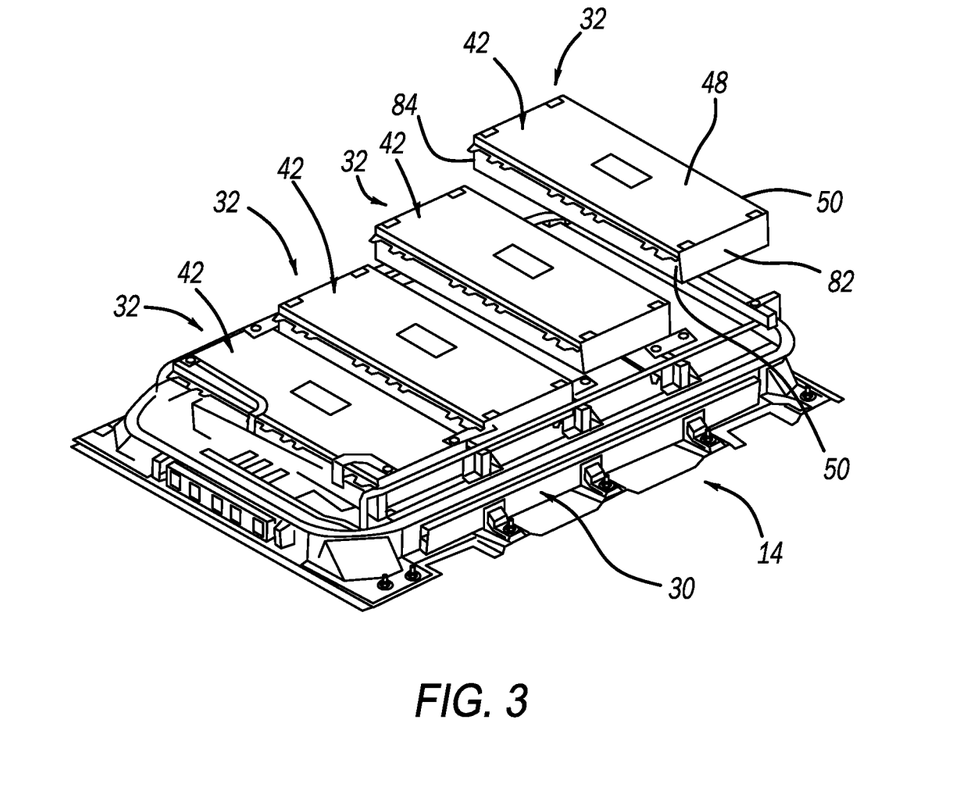
FIG. 3 is another perspective view of the battery housing assembly of FIG. 1 with a lid of the battery housing assembly removed for clarity of illustration.

With reference to FIGS. 2 and 3, the battery housing assembly 14 includes a battery tray or housing 30 and one or more battery arrays 32 (FIG. 3). The battery housing 30 is an enclosure which provides a structural surrounding and sealed compartment for the battery arrays 32 and other battery components such as cooling lines, support brackets, and wiring disposed therein or extending therethrough. The battery housing 30 may disposed at various locations of the vehicle 10 and is mounted to the vehicle frame 12. In this way, the battery housing 30 is supported by the vehicle frame 12 and is remote from a passenger cabin (not shown) and cargo compartments (not shown) of the vehicle 10, therefore, not occupying space that would otherwise be available for passengers or cargo. The battery housing 30 includes a cover or lid 34, a body 36, and a seal (not shown). The lid 34 may optionally be removably coupled to the body 36 via mechanical fasteners such as bolts or screws (not shown), for example. In this way, the lid 34 may be removed to service the battery arrays 32 disposed within the battery housing 30.

The body 36 includes a plurality of side walls or panels 36a and a bottom wall or panel 36b. The side walls 36a may be manufactured via stamping, for example, and extend in a vertical direction Z. The side walls 36a define an outer boundary of the battery housing 30 and are secured to each other via welding or an adhesive, for example. The bottom wall 36b supports the battery arrays 32 disposed within the battery housing 30 and is secured to lower portions of the side walls 36a. The seal is disposed around a periphery of the body 36 and is engaged with the body 36 and the lid 34. In this way, fluids, debris and other materials are inhibited from entering into the battery housing 30.

Figure 4:
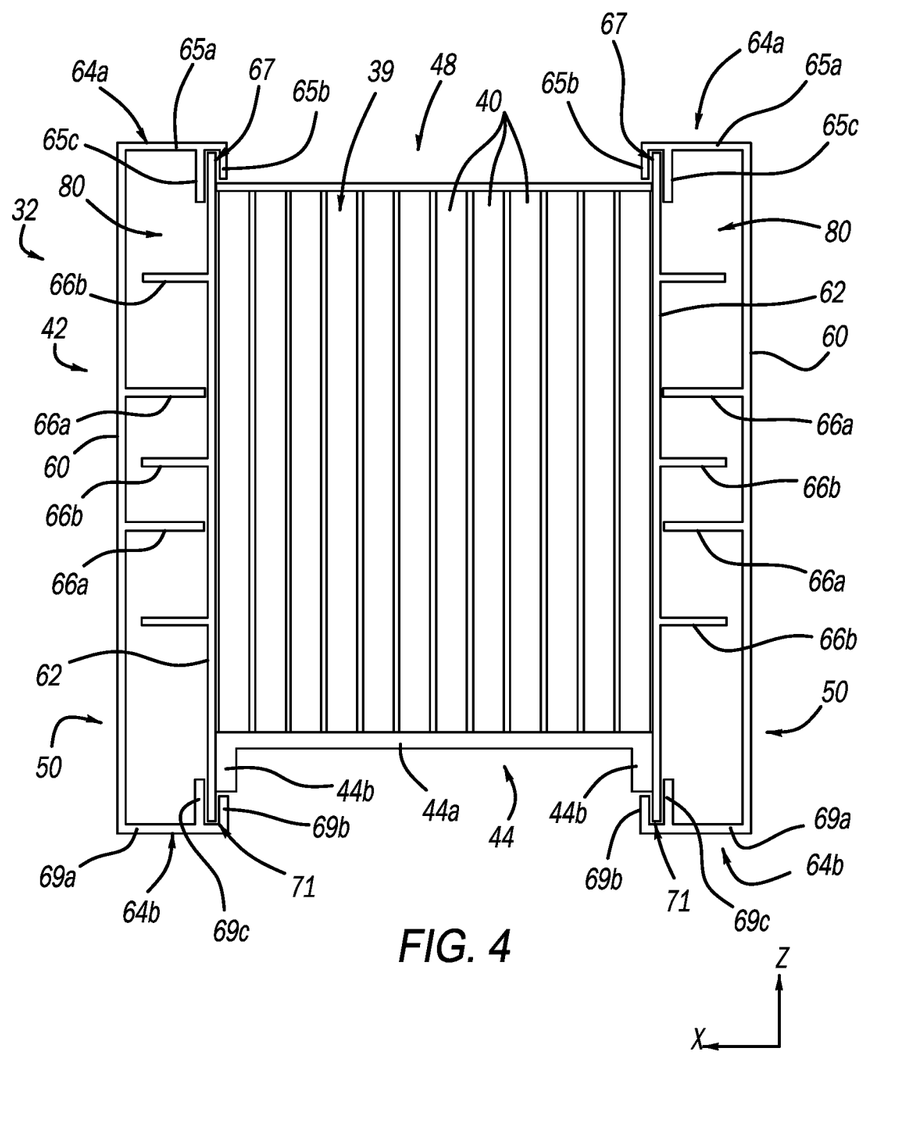
FIG. 4 is a cross-sectional view of a battery array of the battery housing assembly of FIG. 1.

With additional reference to FIG. 4, each battery array 32 may be rechargeable and may include one or more cell stacks 39 formed by battery cells 40 (e.g., lithium-ion batteries such as those in which the cell components are enclosed in an aluminum-coated plastic film, or any other suitable electrical power storage units). In the example illustrated, the cell stacks 39 are formed by battery cells 40 arranged in a side-by-side configuration. In some forms, the cell stacks may be formed by battery cells stacked on each other in a vertical arrangement. Each battery array 32 comprises a structural assembly 42 surrounding and supporting the cell stack 39. In some forms, the battery arrays 32 are in fluid communication with each other via connecting lines (not shown). In this way, fluid such as glycol, for example, is allowed to flow through the structural assembly 42 of each battery array 32, thereby cooling the battery cells 40.

Each structural assembly 42 is in the form of a modular structure that can be installed within and removed from the battery housing 30. Each structural assembly 42 also spans substantially an entire width of the battery housing 30 and is configured to transfer loads from one side of the battery housing 30 to an opposite side of the battery housing 30, for example, during certain side impacts. Stated differently, each modular structural assembly 42 is configured to house the battery cells 40 and transfer loads away from the battery cells 40 during certain side impacts.

Each structural assembly 42 may be removably coupled to the battery housing 30 and includes a cold plate 44, a lid 48 and a pair of cross members 50. In the example illustrated, the cold plate 44 is manufactured via a stamping process, for example, and is made of a metal material. In some forms, the cold plate 44 may be manufactured via other manufacturing processes such as an extrusion process, for example. In the example illustrated, the cold plate 44 is a lower wall configured to support the cell stack 39 and in a heat transfer relationship with the cell stack 39. In some forms, the cold plate 44 may be a wall supporting a respective side of the cell stack 39 or a wall covering a top of the cell stack 39. In one example, an upper surface of the cold plate 44 contacts a lower end of the cell stack 39 such that heat generated by the cell stack 39 is transferred to the cold plate 44. As used herein, the term "heat transfer relationship" should be construed to mean an arrangement in which heat from the cell stack 39 is directly or indirectly transferred to one or more cold plates of the structural assembly 42 via thermal conduction. In the example illustrated, the cold plate 44 is also secured to the pair of cross members 50. The cold plate 44 has a uniform thickness and includes a support portion 44a and a pair of flanges 44b. The support portion 44a extends in a horizontal direction and supports the cell stack 39. Each flange 44b extends downward in a vertical direction from a respective end of the support portion 44a and is secured to a respective cross member 50 of the pair of cross members 50 (i.e., each flange 44b extends perpendicular from the support portion 44a). In the example illustrated, each flange 44b is secured to the respective cross member 50 by welding. In some forms, each flange 44b may be secured to the respective cross member 50 by mechanical fasteners (not shown) such as rivets, screws, or bolts, for example.

The lid 48 is made of a metal material and covers the cell stack 39. The lid 48 has a solid structure and includes a uniform thickness that is less than a thickness of the cross members 50. The lid 48 is secured to the pair of cross members 50 and is disposed between the pair cross members 50. In the example illustrated, the lid 48 is welded to the pair of cross members 50. In some forms, the lid 48 may be secured to the pair of cross members 50 by mechanical fasteners (not shown) such as rivets, screws, or bolts, example. The lid 48 extends in a horizontal direction and covers a top of the cell stack 39. In the example illustrated, the cross members 50 extend upward past the lid 48. Stated differently, the lid 48 is secured to the cross member 50 at a location below an uppermost end of the cross members 50.

The pair of cross members 50 are spaced apart from each other in the longitudinal direction of the vehicle 10 and extends in a transverse direction relative to the longitudinal direction of the vehicle 10. Each cross member 50 supports a respective side of the cell stack 39 and is made of a metal material such as aluminum, for example. In the example illustrated, each cross member 50 extends downward past the cold plate 44.

Each cross member 50 includes an outer wall 60, an inner wall 62, connecting members 64a, 64b, and a plurality of internal stiffening members 66a, 66b. The outer wall 60 extends in a vertical direction and defines an outer boundary of the battery array 32. The inner wall 62 is spaced apart from the outer wall 60 and extends in a vertical direction. In the example illustrated, the inner walls 62 of the pair of cross members 50 are secured to the lid 48 and the cold plate 44 to define a container that the cell stack 39 is disposed in. In the example illustrated, the cold plate 44 is secured to the inner walls 62 of the pair of cross members 50 at a location above the connecting members 64b and the lid 48 is secured to the inner walls 62 of the pair of cross members 50 at a location below the connecting members 64a. In the example illustrated, the inner wall 62 of each cross member 50 is a single component that extends substantially an entire width of the battery structure 14. In some configurations, the inner wall 62 of each cross member 50 is made of two or more adjacent components that together extend substantially an entire width of the battery structure 14. In some forms of the above configuration, the two or more adjacent components of the inner wall 62 of each cross member 50 may be separate (distinct) from each other. In other forms of the above configuration, the two or more adjacent components of the inner wall 62 of each cross member 50 may be joined to each other by welding, adhesives, fasteners, or any other suitable attachment means.

The connecting member 64a connects the upper section of the inner wall 62 with an upper section of the outer wall 60. The connecting member 64a includes a body portion 65a, an outer flange portion 65b, and an inner flange portion 65c. The body portion 65a extends in a horizontal from the outer wall 60 of a respective cross member 50 past the inner wall 62 of the respective cross member 50. The outer flange portion 65b extends downward in a vertical direction from an end of the body portion 65a. The outer flange portion 65b is also located above and is spaced apart from a respective end of the lid 48. The inner flange portion 65c extends downward in a vertical direction from the body portion 65a and is located between the outer wall 60 and the outer flange portion 65b. In the example illustrated, the inner flange portion 65c is adjacent the outer flange portion 65b (i.e., the inner flange portion 65c is closer toward the outer flange portion 65b than the outer wall 60) such that the inner flange portion 65c and the outer flange portion 65b define a channel 67 that an upper end of the inner wall 62 is slidably received in. The inner flange portion 65c also extends downward past the outer flange portion 65b.

The connecting member 64b connects the lower section of the inner wall 62 with a lower section of the outer wall 60. The connecting member 64b includes a body portion 69a, an outer flange portion 69b, and an inner flange portion 69c. The body portion 69a extends in a horizontal from the outer wall 60 of a respective cross member 50 past the inner wall 62 of the respective cross member 50. The outer flange portion 69b extends upward in a vertical direction from an end of the body portion 69a. The outer flange portion 69b is also located below a respective flange 44b of the cold plate 44. The outer flange portion 69b is spaced apart from the respective flange 44b of the cold plate 44. The inner flange portion 69c extends upward in a vertical direction from the body portion 69a and is located between the outer wall 60 and the outer flange portion 69b. In the example illustrated, the inner flange portion 69c is adjacent the outer flange portion 69b such that the inner flange portion 69c and the outer flange portion 69b define a channel 71 that a lower end of the inner wall 62 is slidably received in (i.e., the inner flange portion 69c is closer toward the outer flange portion 69b than the outer wall 60). The inner flange portion 69c also extends upward past the outer flange portion 69b. The inner walls 62 of the pair cross members 50, the cold plate 44, and the lid 48 are secured to each other to define a container that houses the cell stack 39 and is slidable relative to the outer walls 60 of the pair of cross members 50.

The outer wall 60, the inner wall 62 and the connecting members 64a, 64b cooperate to define an internal cavity 80. The internal stiffening members 66a are disposed within the internal cavity 80 and extend in a horizontal direction from the outer wall 60 toward the inner wall 62. In the example illustrated, the internal stiffening members 66a are spaced apart from each other in a vertical direction and are spaced apart from the inner wall 62 of the cross member 50. The internal stiffening members 66b are disposed within the internal cavity 80 and extend in a horizontal direction from the inner wall 62 toward the outer wall 60. In the example illustrated, the internal stiffening members 66b are spaced apart from each other in a vertical direction and are spaced apart from the outer wall 60 of the cross member 50. In this way, sliding of the inner walls 62 of the cross members 50 relative to the outer walls 60 of the cross members 50 are facilitated. In the example illustrated, the internal stiffening members 66a and the internal stiffening members 66b are arranged in an alternating configuration.

As shown in FIG. 3, a first end wall 82 is oriented vertically and is secured to the structural assembly 42. In one example, the first end wall 82 is secured to one or both of the pair of cross members 50, the lid 48 and/or the cold plate 44. The first end wall 82 covers and supports a first end of the cell stack 39 (FIG. 4). Similarly, a second end wall 84 that is opposite the first end wall 82 is oriented vertically and is secured to the structural assembly 42. In one example, the second end wall 84 is secured to one or both of the pair of cross members 50, the lid 48 and/or the cold plate 44. The second end wall 84 covers and supports a second end of the cell stack 39 (FIG. 4) that is opposite the first end of the cell stack 39 (FIG. 4). The end walls 82, 84 are secured to the structural assembly 42 such that the end walls 82, 84 and the structural assembly 42 cooperate to form a structural surrounding and sealed compartment for the cell stack 39 (FIG. 4). In one example, the first and second end walls 82, 84 are secured to gussets (not shown), which are, in turn, secured to the battery housing 30.

The structural assembly 42 of the present disclosure provides multiple functions such as load paths, heat transfer, and fluid flow paths. In one example, the cross members 50 of each structural assembly 42 are configured to house the battery cells 40 and transfer loads across the battery housing 30 away from the battery cells 40 during certain side impacts. In some forms, the structural assembly 42 may be additively manufactured in which one or more walls include an internal lattice structure to provide fluid flow paths for cooling fluid flowing through the structural assembly 42.

Figure 5:
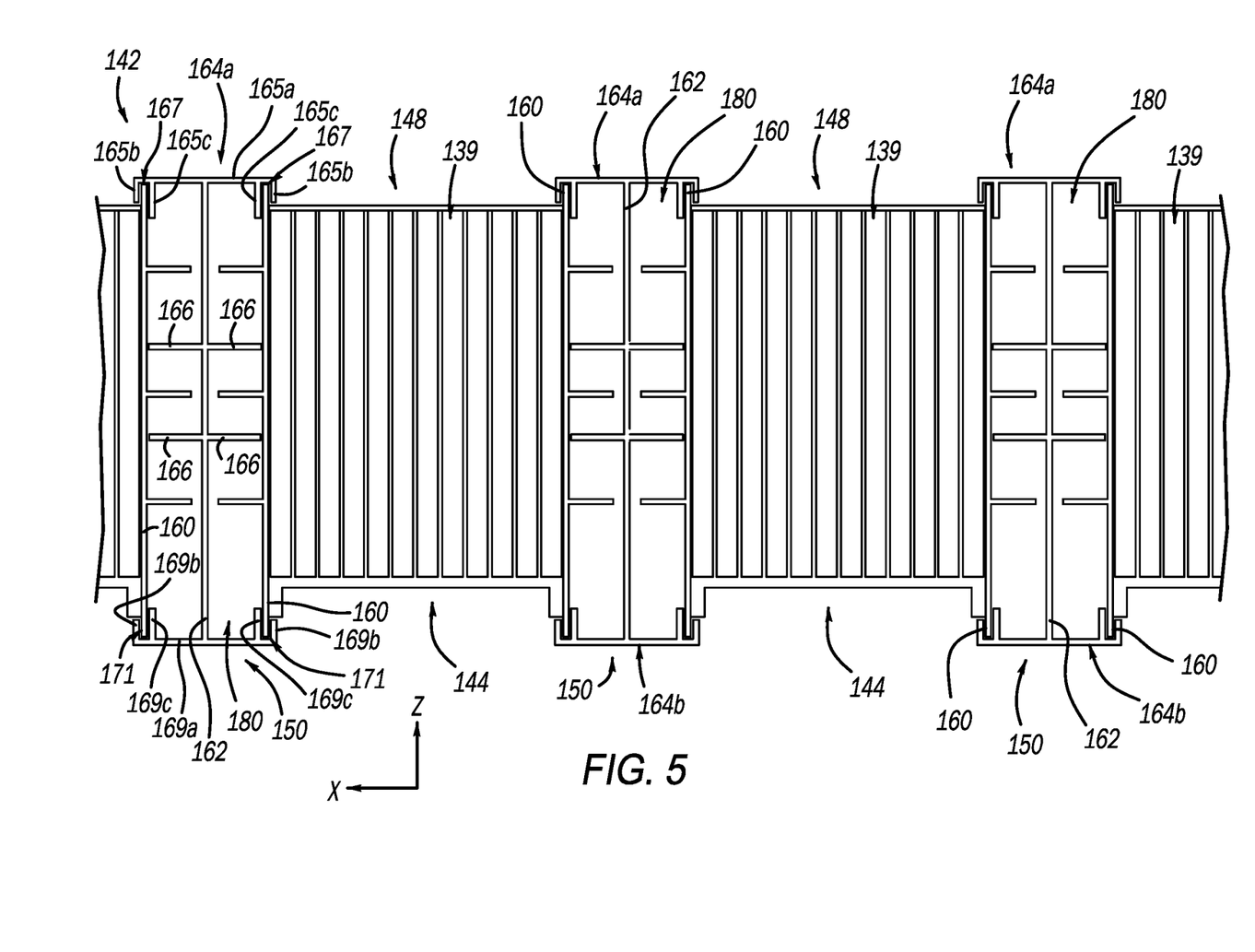
FIG. 5 is a cross-sectional view of an alternate structural assembly that can be incorporated into the battery housing assembly of FIG. 1 according to the principles of the present disclosure.

With reference to FIG. 5, a structural assembly 142 is illustrated. The structural assembly 142 may be incorporated into the battery housing assembly 14 described above, instead of, the structural assembly 42. The structure and function of the structural assembly 142 may be similar or identical to the structural assembly 42 described above, apart for any differences noted below.

The structural assembly 142 surrounds and supports a plurality cell stacks 139. The structural assembly 142 includes a plurality of cold plates 144, a plurality of lids 148, and a plurality of cross members 150.

The structure and function of the cold plates 144 and the lids 148 may be similar or identical to that of the cold plate 44 and the lid 48, respectively, described above, and therefore, will not be described again in detail.

Each cross member 150 is disposed between two adjacent cell stacks 139 and supports a respective side of the two cell stacks 139. Each cross member 150 includes a pair of outer walls 160, an intermediate wall 162, connecting members 164a, 164b, and a plurality of internal stiffening members 166. Each outer wall 160 is spaced apart from the intermediate wall 162 and extends in a vertical direction. In the example illustrated, each outer wall 160 is secured to a respective lid 148 and a respective cold plate 144 to define a container that a respective cell stack 139 is disposed in. Each outer wall 160 is also slidable relative to the intermediate wall 162 and the connecting members 164a, 164b. The intermediate wall 162 extends in a vertical direction and is disposed between the pair of outer walls 160. The intermediate wall 162 also extends from the connecting member 164a to the connecting member 164b.

The connecting member 164a connects the upper section of the intermediate wall 162 with upper sections of the outer walls 160. The connecting member 164a includes a body portion 165a, a pair of outer flange portions 165b, and a pair of inner flange portions 165c. Each outer flange portion 165b extends downward in a vertical direction from a respective end of the body portion 165a. Each outer flange portion 165b is also located above and is spaced apart from a respective end of the lid 148. Each inner flange portion 165c extends downward in a vertical direction from the body portion 165a and is located between the intermediate wall 162 and a respective outer flange portion 165b. In the example illustrated, the inner flange portion 165c is adjacent the respective outer flange portion 165b such that the inner flange portion 165c and the respective outer flange portion 165b define a channel 167 that an upper end of a respective outer wall 162 is slidably received in. The inner flange portion 165c also extends downward past the respective outer flange portion 165b.

The connecting member 164b connects the lower section of the intermediate wall 162 with lower sections of the outer walls 160. The connecting member 164b includes a body portion 169a, a pair of outer flange portions 169b, and a pair of inner flange portions 169c. Each outer flange portion 169b extends upward in a vertical direction from a respective end of the body portion 169a. Each outer flange portion 169b is also located below and is spaced apart from a respective end of the cold plate 144. Each inner flange portion 169c extends upward in a vertical direction from the body portion 169a and is located between the intermediate wall 162 and a respective outer flange portion 169b. In the example illustrated, the inner flange portion 169c is adjacent the respective outer flange portion 169b such that the inner flange portion 169c and the respective outer flange portion 169b define a channel 171 that a lower end of a respective outer wall 162 is slidably received in. The inner flange portion 169c also extends upward past the respective outer flange portion 169b.

The outer walls 160, the intermediate wall 162 and the connecting members 164a, 164b cooperate to define an internal cavity 180. The internal stiffening members 166 are disposed within the internal cavity 180 and extend in a horizontal direction. That is, a plurality of the internal stiffening members 166 extend from the intermediate wall 162 toward one outer wall 160 of the pair of outer walls 160 and a plurality of the internal stiffening members 166 extend from the intermediate wall 162 toward the other outer wall 160 of the pair of outer walls 160. In the example illustrated, the internal stiffening members 166 are spaced apart from the outer walls 162 of the cross member 150. In this way, sliding of the outer walls 160 of the cross members 150 relative to the intermediate walls 162 of the cross members 150 is facilitated.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for a battery structure of an electric vehicle, the structural assembly comprising:
    a first lower wall configured to support a first cell stack; and
    a pair of first cross members spaced apart from each other in a longitudinal direction of the electric vehicle, each first cross member providing lateral support for a respective side of the first cell stack and configured to extend substantially an entire width of a battery enclosure,
    wherein each first cross member comprises an outer wall, an inner wall spaced apart from the outer wall, and connecting members, the outer wall, the inner wall, and connecting members cooperate with each other to define an internal cavity, and
    wherein the inner walls of the first cross members are secured to the first lower wall and slidable relative to the outer walls of the first cross members.

2. The structural assembly of claim 1, wherein the inner wall of one first cross member of the pair of first cross members comprises internal stiffening members disposed within the internal cavity and extending toward the outer wall of the one first cross member.

3. The structural assembly of claim 2, wherein the outer wall of the one first cross member comprises internal stiffening members disposed within the internal cavity and extending toward the inner wall of the one first cross member.

4. The structural assembly of claim 3, wherein the internal stiffening members of the inner wall of the one first cross member are spaced apart from the internal stiffening members of the outer wall of the one first cross member.

5. The structural assembly of claim 3, wherein the internal stiffening members of the inner wall of the one first cross member are spaced apart from the outer wall of the one first cross member, and wherein the internal stiffening members of the outer wall of the one first cross member are spaced apart from the inner wall of the one first cross member.

6. The structural assembly of claim 1, wherein the connecting members of each first cross member comprises an upper connecting member and a lower connecting member, each of the upper and lower connecting members defining a channel that slidably receives a respective end of the inner wall of the first cross member.

7. The structural assembly of claim 1, further comprising a lid covering the first cell stack and secured to the inner walls of the first cross members.

8. The structural assembly of claim 7, wherein the first cross members extend downwardly past the first lower wall and extend upwardly past the lid.

9. The structural assembly of claim 1, wherein the first lower wall is a cold plate, and wherein the cold plate is in a heat transfer relationship with the first cell stack.

10. The structural assembly of claim 1, further comprising:
    a second lower wall configured to support a second cell stack; and
    a pair of second cross members spaced apart from each other in a longitudinal direction of the electric vehicle and secured to ends of the second lower wall, each second cross member providing lateral support for a respective side of the second cell stack and configured to extend substantially an entire width of a battery enclosure,
    wherein one second cross member of the pair of second cross members is connected to one first cross member of the pair of first cross members.

11. A structural assembly for a battery structure of an electric vehicle, the structural assembly comprising:
    a lower wall configured to support a cell stack and in a heat transfer relationship with the cell stack; and
    a pair of cross members spaced apart from each other in a longitudinal direction of the electric vehicle, each cross member of the pair of cross members providing lateral support for a respective side of the cell stack and comprising an outer wall, an inner wall, an upper connecting member and a lower connecting member, the inner wall spaced apart from the outer wall and secured to an end of the lower wall, the upper connecting member includes a pair of upper flanges that extend toward the lower connecting member and cooperate with each other to define an upper channel that slidably receives an upper end of the inner wall, the lower connecting member includes a pair of lower flanges that extend toward the upper connecting member and cooperate with each other to define a lower channel that slidably receives a lower end of the inner wall.

12. The structural assembly of claim 11, wherein the inner wall of a respective cross member comprises internal stiffening members extending toward the outer wall of the respective cross member.

13. The structural assembly of claim 12, wherein the outer wall of the respective cross member comprises internal stiffening members extending toward the inner wall of the respective cross member.

14. The structural assembly of claim 13, wherein the internal stiffening members of the inner wall are spaced apart from the internal stiffening members of the outer wall.

15. The structural assembly of claim 11, wherein the outer wall of the respective cross member comprises internal stiffening members extending toward the inner wall of the respective cross member.

16. The structural assembly of claim 11, further comprising a lid covering the cell stack and secured to the inner walls of the pair of cross members.

17. The structural assembly of claim 16, wherein the lid and the lower wall are secured to the inner walls of the pair of cross members to form a unitized structure that houses the cell stack.

18. The structural assembly of claim 16, wherein the inner wall of each cross member of the pair of cross members extends downwardly past the lower wall and extends upwardly past the lid.

19. A battery structure for an electric vehicle, the battery structure comprising:
    a battery housing; and
    a structural assembly disposed within the battery housing and configured to house a plurality of cell stacks, the structural assembly comprising:
        a plurality of lower walls, each lower wall configured to support a respective cell stack of the plurality of cell stacks and in a heat transfer relationship with the respective cell stack; and
        a plurality cross members spaced apart from each other in a longitudinal direction of the electric vehicle, each cross member of the plurality of cross members being positioned between a corresponding pair of cell stacks of the plurality of cell stacks, each cross member of the plurality of cross members providing lateral support for a respective side of the corresponding pair of cell stacks and comprising a pair of outer walls, an intermediate wall, and connecting members, wherein the connecting members of each cross member comprises an upper connecting member defining a pair of upper channels and a lower connecting member defining a pair of lower channels, each upper channel of the pair of upper channels slidably receiving an upper end of a respective outer wall of the pair of outer walls, each lower channel of the pair of lower channels slidably receiving a lower end of a respective outer wall of the pair of outer walls.

20. The battery structure of claim 19, further comprising a plurality of lids, each lid covering a respective cell stack of the plurality of cell stacks.

* * * * *